United States Patent
Abeywickrama et al.

(10) Patent No.: US 12,260,357 B2
(45) Date of Patent: Mar. 25, 2025

(54) SYSTEM AND METHOD FOR BIPARTITE MATCHING

(71) Applicant: GRABTAXI HOLDINGS PTE. LTD., Singapore (SG)

(72) Inventors: Tenindra Nadeeshan Abeywickrama, Singapore (SG); Chen Liang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/036,265

(22) PCT Filed: Nov. 30, 2021

(86) PCT No.: PCT/SG2021/050740
§ 371 (c)(1),
(2) Date: May 10, 2023

(87) PCT Pub. No.: WO2022/177502
PCT Pub. Date: Aug. 25, 2022

(65) Prior Publication Data
US 2023/0385723 A1    Nov. 30, 2023

(30) Foreign Application Priority Data

Feb. 18, 2021 (SG) ............ 10202101645V (51) Int. Cl.
*G06Q 10/0631* (2023.01)
*G06Q 10/047* (2023.01)
*G06Q 50/40* (2024.01)

(52) U.S. Cl.
CPC ..... *G06Q 10/06311* (2013.01); *G06Q 10/047* (2013.01); *G06Q 50/40* (2024.01)

(58) Field of Classification Search
CPC ........ G06Q 40/04; G06Q 50/30; G06Q 10/02; G06Q 10/107; G06F 16/9024; G06F 16/278; G06F 16/24558
See application file for complete search history.

(56) References Cited

U.S. PATENT DOCUMENTS 5,734,592 A    3/1998    Cox et al.
7,415,461 B1    8/2008    Guha et al.
(Continued)

FOREIGN PATENT DOCUMENTS

CN    109657820 A  *  4/2019  ............ G06Q 10/02
CN    112183938 A    1/2021
(Continued)

OTHER PUBLICATIONS

CornellUniversity, Fall2017Lecturenotes:Matchings. Sep. 1, 2017 [RetrievedonMar. 4, 2022from https:/Awww.cs.cornell.edu/courses/cs6820/2017fa/handouts/matchings.pdf] 1. 1Definitions,3.2Primal-dualalgorithm (Year: 2017).*

(Continued)

*Primary Examiner* — Jerry O'Connor
*Assistant Examiner* — Michael R Koester
(74) *Attorney, Agent, or Firm* — Buckley, Maschoff & Talwalkar LLC (57) ABSTRACT

A system for bipartite matching may: receive a first set of first objects and a second set of second objects; create a minimum priority queue for each unmatched first object of the first set of first objects, wherein the minimum priority queue for each unmatched first object of the first set of first objects comprises unmatched second objects of the second set of second objects; determine a first set of edge data in which lower-bound reduced costs for matching each unmatched first object with the unmatched second objects is less than or equal to zero; determine an exact cost of each (Continued)

edge data in the first set of edge data; and match each unmatched first object of the first set of first objects with an unmatched second object based on the exact cost of each edge data in the first set of edge data.

20 Claims, 5 Drawing Sheets

(56) References Cited

U.S. PATENT DOCUMENTS

| | | | |
|---|---|---|---|
| 2004/0166864 | A1 | 8/2004 | Hill et al. |
| 2011/0231215 | A1 | 9/2011 | Santos et al. |
| 2018/0033058 | A1* | 2/2018 | Mukherjee ............. G06Q 50/01 |
| 2019/0108289 | A1* | 4/2019 | Klein ................... G06F 16/9024 |
| 2021/0227049 | A1* | 7/2021 | Demiralp .............. G01S 13/882 |

FOREIGN PATENT DOCUMENTS

| | | |
|---|---|---|
| KR | 10-2005-0100729 A | 10/2005 |
| TW | 201937418 A | 9/2019 |

OTHER PUBLICATIONS

X. Zhan, et al., "A Graph-Based Approach to Measuring the Efficiency of an Urban Taxi Service System," in IEEE Transactions on Intelligent Transportation Systems, vol. 17, No. 9, pp. 2479-2489, Sep. 2016 <https://ieeexplore.ieee.org/document/7454729?source=IQplus> (Year: 2016).*

Translation of CN 109657820 A (Year: 2019).*

Muller et al.: "Implementing Weighted b-Matching Algorithms: Towards a Flexible Software Design, Publication Date", May 1998; Technische Universitat Berlin, Department of Mathematics.

Chawathe et al.: "Meaningful Change Detection in Structured Data", Publication Date: Jun. 1997.

Ramshaw et al.: "A Weight-Scaling Algorithm for Min-Cost Imperfect Matchings in Bipartite Graphs", Publication Date: Jun. 6, 2012.

Bei et al.: Algorithms for Trip-Vehicle Assignment in Ride-Sharing.

Search Report and Written Opinion dated Sep. 23, 2021 which was issued by the Intellectual Property Office of Singapore in connection with SG10202101645V.

International Search Report and Written Opinion dated Mar. 7, 2022 which was issued in connection with PCT/SG2021/050740.

Cornell University, Fall 2017 Lecture notes: Matchings. Sep. 1, 2017 1.1 Definitions, 3.2 Primal-dual algorithm Citation is not enclosed due to copyright restrictions. Obtained from the URL at https://www.cs.cornell.edu/courses/cs6820/2017fa/handouts/matchings.

Examination Report dated Nov. 18, 2022 which was issued by the Intellectual Property Office of Singapore in connection with SG10202101645V.

* cited by examiner

SYSTEM AND METHOD FOR BIPARTITE MATCHING

The present invention is a 371 of International Application No. PCT/SG2021/05074, filed on Nov. 30, 2021, and claiming priority to Singapore application No. 10202101645V filed on Feb. 18, 2021, incorporated by reference herein in its entirety.

TECHNICAL FIELD

Various aspects of this disclosure relate to a system for bipartite matching. Various aspects of this disclosure relate to a method for bipartite matching. Various aspects of this disclosure relate to a non-transitory computer-readable medium storing computer executable code comprising instructions for bipartite matching. Various aspects of this disclosure relate to a computer executable code comprising instructions for bipartite matching.

BACKGROUND

The minimum weight bipartite matching problem, also known as the assignment problem is the problem of matching every object in U to exactly one object in V, such that the sum of the weights for assigned pairs is minimized.

Previously, the assignment problem may be solved using the Hungarian Method, also known as the Kuhn-Munkres algorithm. However, this technique and other variants assume that all costs c(u, v) are known at the beginning of the algorithm (i.e., the cost matrix is known beforehand). In many applications, the cost matrix must be computed for each new assignment and is more computationally expensive than the assignment itself.

Prior art related to the assignment problem consists of systems that use the KM algorithm as a component in an overall system that solves some specific problem (for example driver-order matching). These works do not make any improvement to the assignment process at all. Some prior art may present a modified Hungarian Method. However, the technique disclosed modifies the Hungarian algorithm to solve the top-k problem, but does not solve the assignment problem itself.

SUMMARY

Therefore, there is a need to provide a system and method of solving the bipartite matching problem with lower computational cost.

An advantage of the present disclosure may include lower computational cost and/or faster computational time as the technique disclosed incrementally computes the exact costs only when absolutely necessary. Lower-bounds on the cost may be used to determine when exact computation is necessary. Lower-bounds are typically significantly cheaper to compute than computing the exact cost in many cases. By avoiding computation of exact costs by substituting them with lower-bound costs, the technique disclosed may significantly reduce the computation cost and/or computational time.

These and other aforementioned advantages and features of the aspects herein disclosed will be apparent through reference to the following description and the accompanying drawings. Furthermore, it is to be understood that the features of the various aspects described herein are not mutually exclusive and can exist in various combinations and permutations.

The present disclosure generally relates to a system for bipartite matching. The system may include one or more processors. The system may include a memory having instructions stored therein, the instructions, when executed by the one or more processors, causing the one or more processors to: receive a first set of first objects and a second set of second objects; create a minimum priority queue for each unmatched first object of the first set of first objects, wherein the minimum priority queue for each unmatched first object of the first set of first objects comprises unmatched second objects of the second set of second objects; determine a first set of edge data in which lower-bound reduced costs for matching each unmatched first object with the unmatched second objects is less than or equal to zero; determine an exact cost of each edge data in the first set of edge data; and match each unmatched first object of the first set of first objects with an unmatched second object of the second set of second objects based on the exact cost of each edge data in the first set of edge data.

According to an embodiment, the one or more processors may be configured to matching each unmatched first object of the first set of first objects with an unmatched second object of the second set of second objects using a Breadth-first search (BF S) algorithm.

According to an embodiment, the one or more processors may be configured to give a first label to the first set of first objects and a second label to the second set of second objects. The exact cost of each edge data may be based on the lower-bound reduced costs, the first label and the second label.

According to an embodiment, the one or more processors may be configured to update the first label to obtain an updated first label and configured to update the second label to obtain an updated second label based on a minimum reduced cost of the lower-bound reduced costs.

According to an embodiment, the one or more processors may be configured to obtain the updated first label by addition of the first label with the minimum reduced cost and configured to obtain the updated second label by subtraction of the second label with the minimum reduced cost.

According to an embodiment, the one or more processors may be configured to determine if there are any unmatched first objects, configured to determine a second exact cost of each edge data based on the lower-bound reduced costs, the updated first label and the updated second label and configured to match the unmatched first objects based on the second exact cost.

According to an embodiment, the one or more processors may be further configured to update the minimum priority queue for each unmatched first object of the first set of first objects after the exact cost of each edge data in the first set of edge data is determined by arranging the minimum priority queue according to an ascending order of the exact cost of each edge data.

According to an embodiment, the one or more processors may be configured to update the minimum priority queue for each unmatched first object of the first set of first objects after the exact cost of each edge data in the first set of edge data is determined by removing unmatched second objects which have the lower-bound reduced costs for matching each unmatched first object of more than zero.

According to an embodiment, the first set of objects may include a set of passengers and the second set of objects may include a set of drivers. The exact cost of each edge data in the first set of edge data may be a distance between each passenger in the set of passengers and each driver in the set of drivers.

The present disclosure generally relates to a method for bipartite matching. The method may include: using one or more processors to: receive a first set of first objects and a second set of second objects; create a minimum priority queue for each unmatched first object of the first set of first objects, wherein the minimum priority queue for each unmatched first object of the first set of first objects comprises unmatched second objects of the second set of second objects; determine a first set of edge data in which lower-bound reduced costs for matching each unmatched first object with the unmatched second objects is less than or equal to zero; determine an exact cost of each edge data in the first set of edge data; and match each unmatched first object of the first set of first objects with an unmatched second object of the second set of second objects based on the exact cost of each edge data in the first set of edge data.

According to an embodiment, the method may include using the one or more processors to: match each unmatched first object of the first set of first objects with an unmatched second object of the second set of second objects using a Breadth-first search (BFS) algorithm.

According to an embodiment, the method may include using the one or more processors to: give a first label to the first set of first objects and a second label to the second set of second objects, wherein the exact cost of each edge data is based on the lower-bound reduced costs, the first label and the second label.

According to an embodiment, the method may include using the one or more processors to: update the first label to obtain an updated first label and configured to update the second label to obtain an updated second label based on a minimum reduced cost of the lower-bound reduced costs.

According to an embodiment, the method may include using the one or more processors to: obtain the updated first label by addition of the first label with the minimum reduced cost; and obtain the updated second label by subtraction of the second label with the minimum reduced cost.

According to an embodiment, the method may include using the one or more processors to: determine if there are any unmatched first objects; determine a second exact cost of each edge data based on the lower-bound reduced costs, the updated first label and the updated second label; and match the unmatched first objects based on the second exact cost.

According to an embodiment, the method may include using the one or more processors to: update the minimum priority queue for each unmatched first object of the first set of first objects after the exact cost of each edge data in the first set of edge data is determined by arranging the minimum priority queue according to an ascending order of the exact cost of each edge data.

According to an embodiment, the method may include using the one or more processors to: update the minimum priority queue for each unmatched first object of the first set of first objects after the exact cost of each edge data in the first set of edge data is determined by removing unmatched second objects which have the lower-bound reduced costs for matching each unmatched first object of more than zero.

According to an embodiment, the first set of objects may include a set of passengers and the second set of objects may include a set of drivers, and wherein the exact cost of each edge data in the first set of edge data is a distance between each passenger in the set of passengers and each driver in the set of drivers.

The present disclosure generally relates to a non-transitory computer-readable medium storing computer executable code may include instructions for bipartite matching according to the present disclosure.

The present disclosure generally relates to a computer executable code may include instructions for bipartite matching according to the present disclosure.

To the accomplishment of the foregoing and related ends, the one or more embodiments include the features hereinafter fully described and particularly pointed out in the claims. The following description and the associated drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the systems or server or methods or computer program are analogously valid for the other systems or server or methods or computer program and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "exemplary" is used herein to mean "serving as an example, instance, or illustration." Any embodiment or design described herein as "exemplary" is not necessarily to be construed as preferred or advantageous over other embodiments or designs In the context of various embodiments, the articles "a", "an", and "the" as used with regard to a feature or element include a reference to one or more of the features or elements.

As used herein, the term "and/or" includes any and all combinations of one or more of the associated listed items.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for the present system, and various aspects are provided for the methods. It will be understood that the basic properties of the system also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

To more readily understand and put into practical effect, the present system, method, and other particular aspects will now be described by way of examples and not limitations, and with reference to the figures. For the sake of brevity, duplicate descriptions of features and properties may be omitted.

It will be understood that any property described herein for a specific system or device may also hold for any system or device described herein. It will also be understood that any property described herein for a specific method may hold for any of the methods described herein. Furthermore, it will be understood that for any device, system, or method described herein, not necessarily all the components or operations described will be enclosed in the device, system, or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled or as mechanically coupled, e.g., attached or fixed or attached, or just in contact without any fixation, and it will be understood that both direct coupling or indirect coupling (in other words: coupling without direct contact) may be provided.

Figure 1:
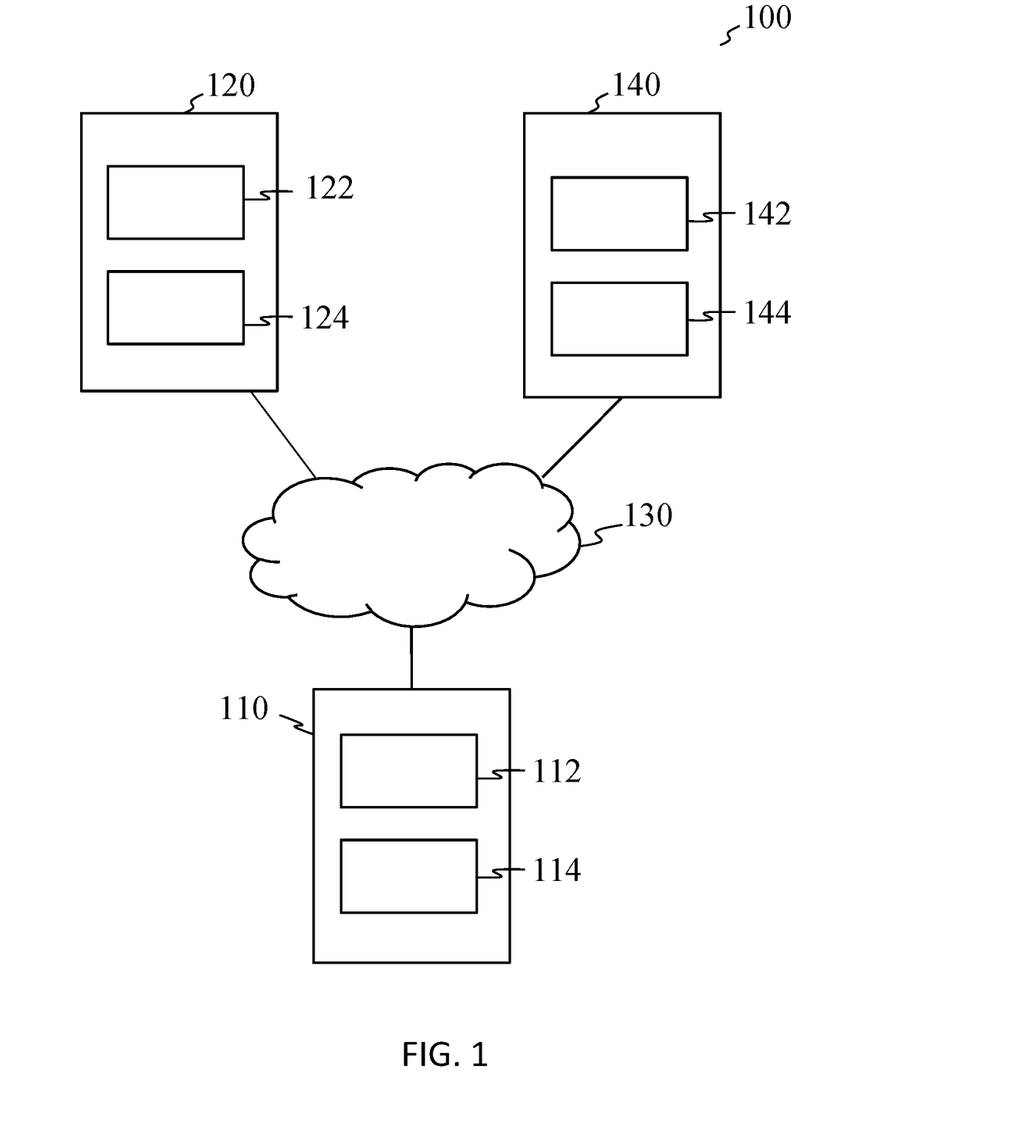
FIG. 1 illustrates a system according to an embodiment of the present disclosure.

FIG. 1 illustrates a system according to an embodiment of the present disclosure.

According to various embodiments, the system 100 may be used for bipartite matching. In various embodiments, the system 100 may include a server 110 or may be server 110.

In various embodiments, the server 110 may be a single server as illustrated schematically in FIG. 1, or have the functionality performed by the server 110 distributed across multiple server components. In an embodiment, The server 110 may include one or more server processor(s) 112. In an embodiment, the various functions performed by the server 110 may be carried out across the one or more server processor(s). In an embodiment, each specific function of the various functions performed by the server 110 may be carried out by specific server processor(s) of the one or more server processor(s).

In an embodiment, the server 110 may include a memory 114. In an embodiment, the server 110 may also include a database. In an embodiment, the memory 114 and the database may be one component or may be separate components. In an embodiment, the memory 114 of the server may include computer executable code defining the functionality that the server 110 carries out under control of the one or more server processor 112.

According to various embodiments, memory 114 may include or may be a computer program product such as a non-transitory computer-readable medium.

According to various embodiments, a computer program product may store the computer executable code including instructions for bipartite matching according to the various embodiments. In an embodiment, the computer executable code may be a computer program. In an embodiment, the computer program product may be a non-transitory computer-readable medium. In an embodiment, the computer program product may be in the system 100 and/or the server 110.

In an embodiment, the system 100 may be used for bipartite matching. In an embodiment, the memory 114 may have instructions stored therein. In an embodiment, the instructions, when executed by the one or more processors may cause the one or more processors 112 to use at least one neural network to conduct bipartite matching.

In an embodiment, the one or more processors 112 may be configured to receive a first set of first objects. In an embodiment, the one or more processors 112 may be configured to receive a second set of second objects.

In an embodiment, the first set of first objects and the second set of second objects may form a bipartite graph. In an embodiment, the system may perform bipartite matching by matching a first object from the first set of first objects to a second object from the second set of second objects. In an embodiment, matching in a bipartite graph may be a set of the edges chosen in such a way that no two edges share an endpoint. In an embodiment, each first object is matched to only one second object. In an embodiment, each second object is matched to only one first object. In an embodiment, every edge matching a first object to a second object may have a weight associated to it. In an embodiment, minimum weight bipartite matching may be performed. In an embodiment, minimum weight bipartite matching may result in the first set of first objects and the second set of second objects being matched to each other with the lowest summation of total weights of the edges.

In an embodiment, the one or more processors 112 may be configured to create a minimum priority queue for each unmatched first object of the first set of first objects. In an embodiment, the minimum priority queue for each unmatched first object of the first set of first objects may include unmatched second objects of the second set of second objects.

In an embodiment, the one or more processors 112 may be configured to determine a first set of edge data. In an embodiment, the first set of edge data may include data in which lower-bound reduced costs for matching each unmatched first object with the unmatched second objects may be less than or equal to zero.

In an embodiment, the one or more processors 112 may be configured to determine an exact cost of each edge data in the first set of edge data.

In an embodiment, the one or more processors 112 may be configured to match each unmatched first object of the first set of first objects with an unmatched second object of the second set of second objects based on the exact cost of each edge data in the first set of edge data.

In an embodiment, the one or more processors 112 may be configured to match each unmatched first object of the first set of first objects with an unmatched second object of the second set of second objects. In an embodiment, the matching may be done using a Breadth-first search (BFS) algorithm.

In an embodiment, the one or more processors 112 may be configured to give a first label to the first set of first objects. In an embodiment, the one or more processors 112 may be configured to give a second label to the second set of second objects. In an embodiment, the exact cost of each edge data may be based on the lower-bound reduced costs and/or the first label and/or the second label.

In an embodiment, the one or more processors 112 may be configured to update the first label to obtain an updated first label. In an embodiment, the one or more processors 112 may be configured to update the second label to obtain an updated second label. In an embodiment, the one or more processors 112 may be configured to obtain the updated first label and/or the updated second label based on a minimum reduced cost of the lower-bound reduced costs.

In an embodiment, the one or more processors 112 may be configured to obtain the updated first label by addition of the first label with the minimum reduced cost. In an embodiment, the one or more processors 112 may be configured to obtain the updated second label by subtraction of the second label with the minimum reduced cost.

In an embodiment, the one or more processors 112 may be configured to determine if there are any unmatched first objects, In an embodiment, the one or more processors 112 may be configured to determine a second exact cost of each edge data based on the lower-bound reduced costs, and/or the updated first label and/or the updated second label. In an embodiment, the one or more processors 112 may be configured to match the unmatched first objects based on the second exact cost.

In an embodiment, the one or more processors 112 may be configured to update the minimum priority queue for each unmatched first object of the first set of first objects. In an embodiment, the minimum priority queue may be updated after the exact cost of each edge data in the first set of edge data is determined. In an embodiment, the one or more processors 112 may be configured to arrange the minimum priority queue according to an ascending order of the exact cost of each edge data.

In an embodiment, the one or more processors 112 may be configured to update the minimum priority queue for each unmatched first object of the first set of first objects by removing unmatched second objects which have the lower-bound reduced costs for matching each unmatched first object of more than zero.

In an embodiment, the first set of objects may include a set of passengers. In an embodiment, the second set of objects may include a set of drivers. In an embodiment, the exact cost of each edge data in the first set of edge data may be a distance between each passenger in the set of passengers and each driver in the set of drivers.

In an embodiment, the system may be configured to control and/or communicate with the first set of first objects and/or the second set of second objects. In an embodiment, the system may be configured to control and/or communicate with the first set of first objects using one or more first object device 120. In an embodiment, the system may be configured to control and/or communicate with the second set of first objects using one or more second object device 140. In an embodiment, the server 110 may be configured to control and/or communicate with the first set of first objects and/or the second set of second objects. In an embodiment, the one or more first object device 120 and/or the one or more second object device 140 may be the server 110 or may be a part of the server 110.

In some embodiments, the server 110 and the one or more first object device 120 may be in communication with each other through communication network 130. The server 110 and the one or more second object device 140 may also be in communication with each other through communication network 130. Even though FIG. 1 shows a line connecting the server 110 to the communication network 130, a line connecting the one or more first object device 120 to the communication network 130, and a line connecting the one or more second object device 140 to the communication network 130, the server 110, the one or more first object device 120, and the one or more second object device 140 may not be physically connected to each other, for example through a cable. Instead, the server 110, the one or more first object device 120, and the one or more second object device 140 may be able to communicate wirelessly through communication network 130 by internet communication protocols or through a mobile cellular communication network.

In some embodiments, the server 110 may also include an input and/or output module allowing the server 110 to communicate over the communication network 130. In an embodiment, the server 110 may also include a user interface for user control of the server 110. In an embodiment, the user interface may include, for example, computing peripheral devices such as display monitors, user input devices, for example, touchscreen devices and computer keyboards.

In an embodiment, the one or more first object device 120 may include a first object device memory 122. In an embodiment, the one or more first object device 120 may include a first object device processor 124. In an embodiment, the first object device memory 122 may include computer executable code defining the functionality the one or more first object device 120 carries out under control of the first object device processor 124. In an embodiment, the first object device memory 122 may include or may be a computer program product such as a non-transitory computer-readable medium.

In an embodiment, the one or more first object device 120 may also include an input and/or output module allowing the one or more first object device 120 to communicate over the communication network 130. In an embodiment, the one or more first object device 120 may also include a user interface for the user to control the one or more first object device 120. In an embodiment, the user interface may be a touch panel display. In an embodiment, the user interface may include a display monitor, a keyboard or buttons.

In an embodiment, the one or more second object device 140 may include a second object device memory 142. In an embodiment, the one or more second object device 140 may include a second object device processor 144. In an embodiment, the second object device memory 142 may include computer executable code defining the functionality the one or more second object device 140 carries out under control of the second object device processor 144. In an embodiment, the second object device memory 142 may include or may be a computer program product such as a non-transitory computer-readable medium.

In an embodiment, the one or more second object device 140 may also include an input and/or output module allowing the one or more second object device 140 to communicate over the communication network 130. In an embodiment, the one or more second object device 140 may also include a user interface for the user to control the one or more second object device 140. In an embodiment, the user interface may be a touch panel display. In an embodiment, the user interface may include a display monitor, a keyboard or buttons.

In an embodiment, after the server 110 matches a first object from the first set of first objects with a second object from the second set of second objects, the server 110 may notify a relevant first object device of the one or more first object device 120, and/or a relevant second object device of the one or more second object device 140.

In an example, the server may match the first object to the second object, and may send a notification informing the first object and the second object of the match to each other. In an example, the first object may be a passenger and the second object may be a driver, and the system may match the first object to the second object for transportation purposes.

In an embodiment, the system 100 may solve the minimum weight bipartite matching problem, which may be known as the assignment problem.

In an embodiment, given two sets of objects, first object set U and second object set V, every pair of objects may be associated with some cost $c(u, v)$ where $u \in U$, $v \in V$, which represents the cost of assigning u to v. In an embodiment, the costs may be presented as a cost matrix. In an embodiment, the first objects, the second objects, and the costs may be represented as a bipartite graph $G=(U \cup V, E)$ with $(u, v) \in E$ is a set of edges with weights $c(u, v)$ connecting all pairs of vertices in the bipartite sets U and V. In an embodiment, the assignment problem may find a matching, where every object in U is assigned to exactly one object in V (and vice versa). The sum of the weights for assigned pairs may be minimized. For example, given a set of passengers and a set of drivers connected to a ride-hailing service, the weight might be the travel time for the driver to reach the passenger. Thus, the algorithm may assign passengers to drivers such that the total travel time may be minimized amongst all pairs of passengers and drivers. Thus, globally minimizing the unprofitable transportation costs for drivers and also minimizing the wait time for passengers.

Figure 2:
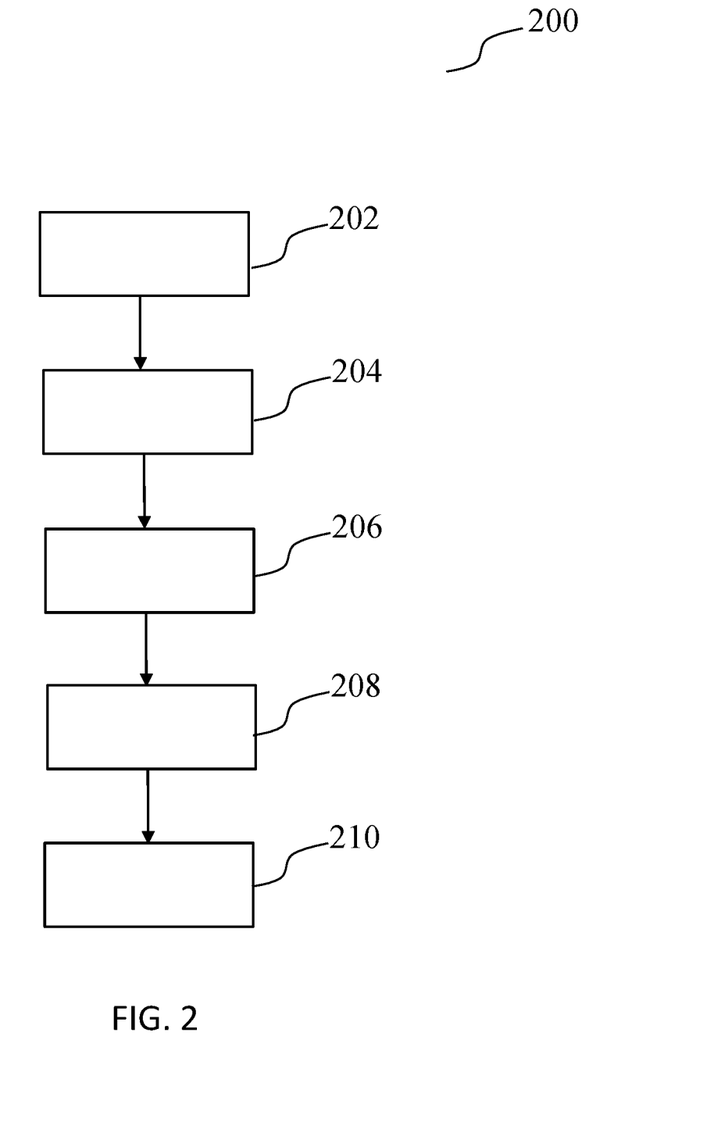
FIG. 2 shows a flowchart of a method according to various embodiments.

FIG. 2 shows a flowchart of a method according to various embodiments.

According to various embodiments, the method 200 for bipartite matching may be provided. In an embodiment, the method 200 may include a step 202 of using one or more processors to receive a first set of first objects and a second set of second objects.

In an embodiment, the method 200 may include a step 204 of using one or more processors to create a minimum priority queue for each unmatched first object of the first set of first objects. The minimum priority queue for each unmatched first object of the first set of first objects may include unmatched second objects of the second set of second objects.

In an embodiment, the method 200 may include a step 206 of using one or more processors to determine a first set of edge data in which lower-bound reduced costs for matching each unmatched first object with the unmatched second objects is less than or equal to zero.

In an embodiment, the method 200 may include a step 208 of using one or more processors to determine an exact cost of each edge data in the first set of edge data.

In an embodiment, the method 200 may include a step 210 of using one or more processors to determine match each unmatched first object of the first set of first objects with an unmatched second object of the second set of second objects based on the exact cost of each edge data in the first set of edge data.

In an embodiment, steps 202 to 210 are shown in a specific order, however other arrangements are possible. Steps may also be combined in some cases. Any suitable order of steps 202 to 210 may be used.

Figure 3:
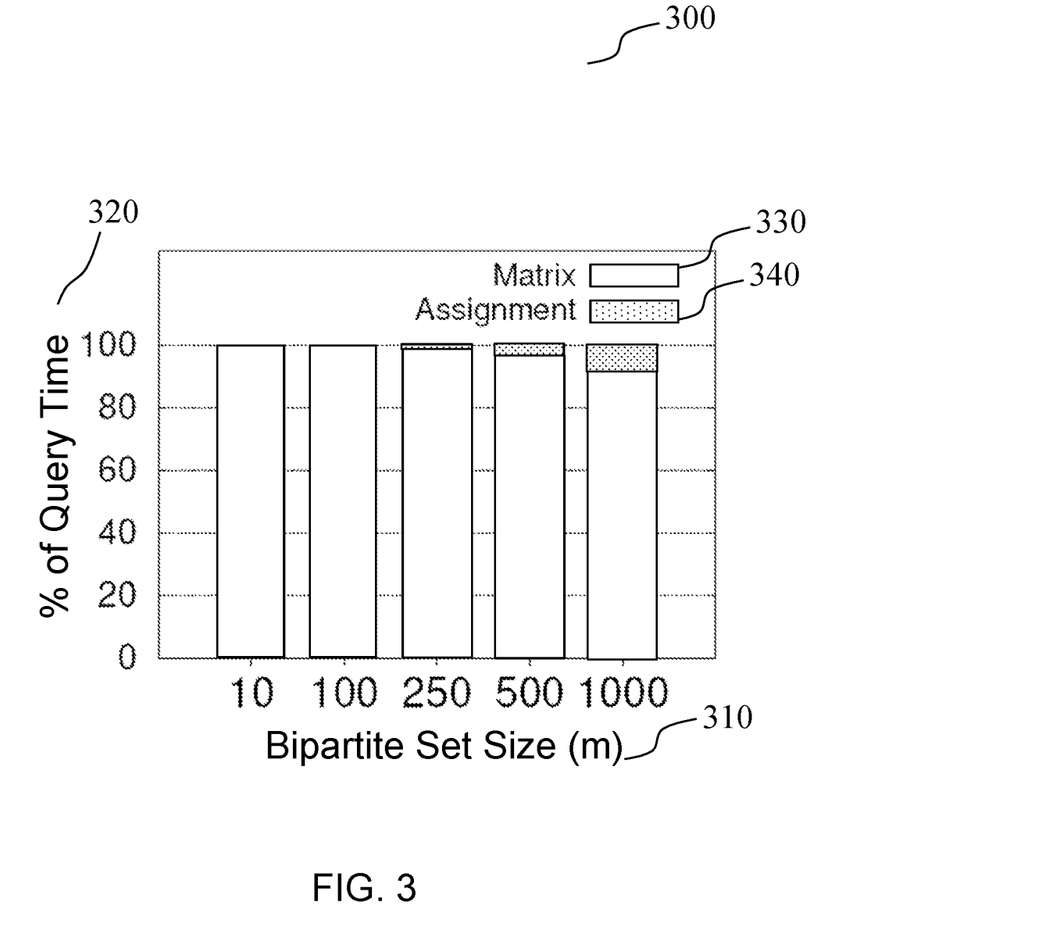
FIG. 3 shows a chart of exemplary query time of various bipartite set sizes according to various embodiments.

FIG. 3 shows a chart of exemplary query time of various bipartite set sizes according to various embodiments.

Previously, the assignment problem may be solved using the Hungarian Method, also known as the Kuhn-Munkres algorithm. However, this technique and other variants assume that all costs c(u, v) are known at the beginning of the algorithm (i.e., the cost matrix is known beforehand). In many applications, the cost matrix must be computed for each new assignment and is more computationally expensive than the assignment itself. For example, the cost represents the shortest path distance between the driver and the passenger.

If Dijkstra's algorithm was used for these computations, this would require O(mnlogn) time where n is the number of vertices in the graph and m is the number of objects in each set, as m separate Dijkstra searches are conducted, one from each object in set U.

On the other hand, the Hungarian algorithm time complexity is typically $O(m^3)$. In real-world scenarios we can expect O(mnlogn) to be significantly larger than $O(m^3)$. For example for the Singapore road network n is over 400,000 while m might be 100 (e.g., representing a problem of matching 100 drivers to 100 passengers based on their shortest path distances in the Singapore road network).

As shown in the chart 300 of FIG. 3, the query time 320 to compute the matrix 330 dominates the time to compute the optimal assignment 340 even for large values of bipartite set sizes m 310.

In an embodiment, a modified Kuhn-Munkres variant that incrementally computes the exact costs only when absolutely necessary is disclosed. In an embodiment, lower-bounds may be used on the cost to determine when exact computation is necessary. Lower-bounds may be cheaper to compute than computing the exact cost. For example, Euclidean distance may be used as a lower-bound for shortest paths in road network graphs. In an embodiment, by avoiding computation of exact costs and by substituting them with lower-bound costs can significantly reduce the matrix computation cost of FIG. 3.

In an embodiment, the technique disclosed may be effective for assignment in real-world map-based applications. In an example, drivers may be assigned to passengers where cost is the travel time from driver to passenger. Given a geographic region, such as Singapore, typically passengers and drivers will be distributed in various parts of the region. In an embodiment, it may be unlikely that a driver u∈U will be assigned to some passenger v∈V who is a significant distance away. In an embodiment, a greedy heuristic may be applied when attempting assignment and the computation of the edges costs.

In an embodiment, given a object u∈U, a priority queue-like data structure which may include objects from V may be ordered by a lower-bound cost for u. In an embodiment, to avoid computation of exact costs of objects in V that may not be assigned to u in an optimal assignment, unwanted objects in V may be removed.

Figure 4:
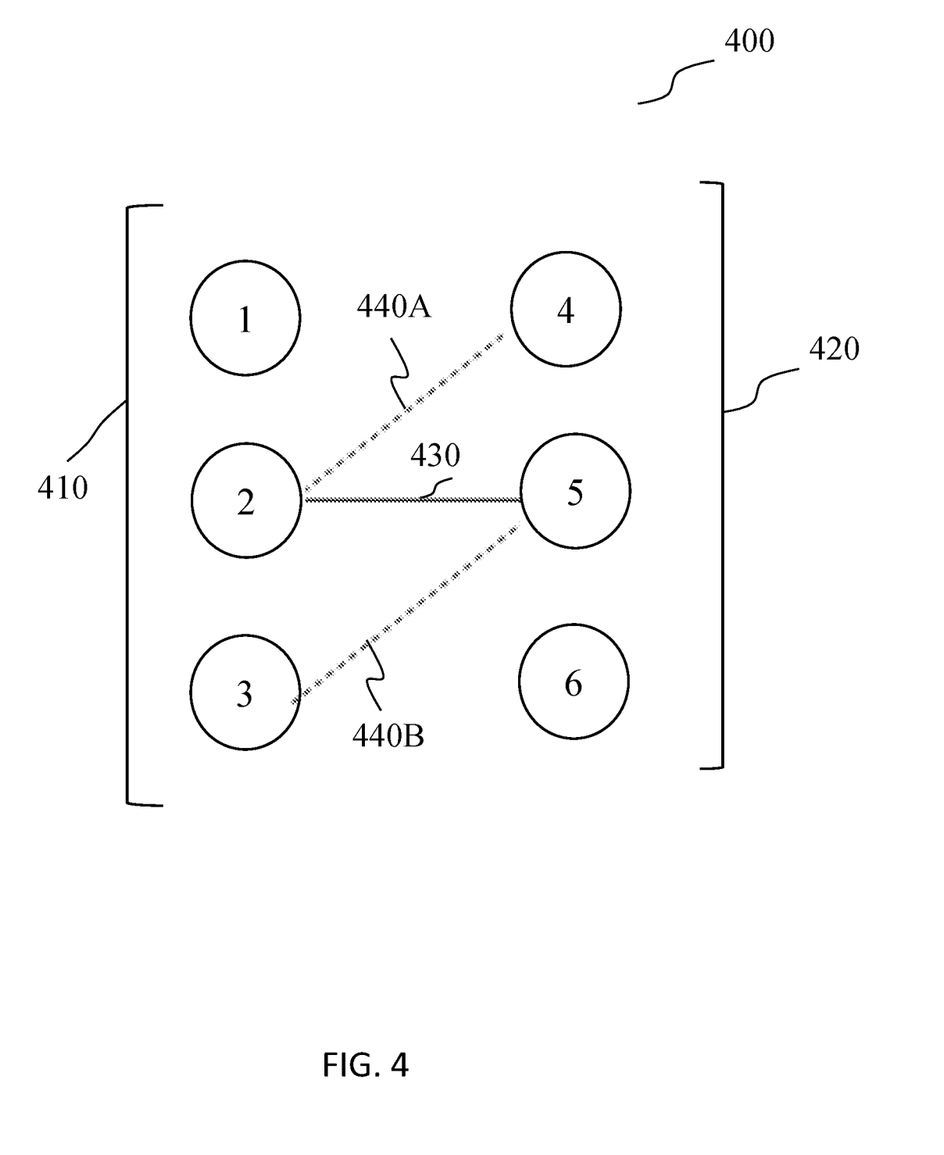
FIG. 4 illustrates a schematic diagram of an exemplary bipartite graph according to various embodiments.

FIG. 4 illustrates a schematic diagram of an exemplary bipartite graph according to various embodiments.

In an embodiment, the minimum-weight bipartite matching works by iteratively expanding a solution until the optimal assignment is found. In an embodiment, a first label $l_u$ may be assigned to each vertex (i.e., first object) u∈U. The first label $l_u$ may be initially assigned with a value of zero. In an embodiment, a second label $l_v$ may be assigned to each vertex (i.e., second object) v∈V. The second label $l_v$ may be initially assigned with a value of zero.

In an embodiment, a reduced cost of each edge (u, v)∈E may be:

$$c_r(u,v) = c(u,v) - l_u - l_v \qquad \text{(Equation 1)}.$$

In an embodiment, a matching M may be defined as selection of edges in E where no edge in M has a shared endpoint with any other edge in M. That is, any vertex in U∪V may "touched" exactly once by an edge in M. In an embodiment, the goal of the algorithm may be to find a matching with minimum total cost such that every vertex U∪V is "touched" exactly once. In an embodiment, to find this matching the algorithm may adjust the labels of each vertex while maintaining the following invariants:

The reduced cost of each edge may be nonnegative, i.e., $c^r(u,v) \geq 0$ (Equation 2).

Each edge in M may be "tight" in that it may have a reduced cost of zero, i.e., $c^r(u,v)=0$ where $(u,v) \in M$ (Equation 3).

In an embodiment, a matching M found while the invariants (i.e., equations) (2) and (3) hold may provide an optimal solution to the minimum-weight bipartite matching problem.

In an embodiment, the system may find the match by iteratively expanding a matching M (which may be initially empty) and/or creating new tight edges by adjusting the labels $l_u$ and $l_v$.

In an embodiment, the system may find augmenting paths. In an embodiment, the augmenting path may be a match between the first object and the second object. In an embodiment, the system may use a breadth-first search (BFS) to find the augmenting path.

In the example of FIG. 2, vertices 1, 2 and 3 belong to set U 410 and vertices 4, 5 and 6 belong to set V 420. A solid edge 430 from vertex 2 to 5 may be the only edge in the matching M. The dotted edges 440A and 440B may represent edges with a reduced cost of zero (i.e., zero edges), and potential assignments in the optimal solution by the invariants described above.

In an embodiment, the system may choose an unassigned vertex in the bipartition U, for example vertex 3, and may conduct a BFS towards vertices in V following only zero edges not in M. In an embodiment, the search may continue from any vertices in V reached this way back towards U by only edges in already in the matching M. In an embodiment, if any path terminates at a unassigned vertex in V then an augmenting path is found.

In the example of FIG. 4, the path 3 to 5 to 3 to 4 is an augmenting path. In an embodiment, by toggling the edges in the augmenting path (i.e., add the dotted edges in the augmenting path to M and remove the solid edges from M) the size of the matching M may increased by 1.

In an embodiment, there may be a scenario where no augmenting paths are found in a reduced graph. In an embodiment, the system may adjust the label values such that new tight edges may be added to the reduced graph until an augmenting path is found.

In an embodiment, set $S \subseteq U$ may include vertices in U visited by the augmenting path search (which may originate from all free vertices in U).

In an embodiment, let $N(S) \subseteq V$ be the vertices in V visited by the same augmenting path search. In an embodiment, the system may increase $l_u$ by $\Delta$ for all $u \in S$. In an embodiment, the system may decrease $l_v$ by $\Delta$ or all $v \in N(S)$. In an embodiment, the system may choose $\Delta$ such that it may be the largest possible value while maintaining the invariant in Eq. (2) (that all reduced costs are non-negative). In an embodiment, this may be equivalent to smallest reduced cost by Eq. 1 for an edge (u, v) where $u \in S$ and $v \notin N(S)$, or: $\Delta := \min\{c(u,v) - l_u - l_v : u \in S, v \notin N(S)\}$ (Equation 4).

In an embodiment, a pseudocode for a previous solution, the Kuhns-Munkres

Algorithm may be provided below:
Input: Bipartite Sets U and V with size |U| = |V| = m;
Compute Edge Costs c(u, v) ∀ u ∈ U and v ∈ V (in a m × m matrix);
Initialize matching M = Φ;
Initialize labels $l_u$ = $l_v$ = 0;
while M is not a perfect matching (i.e., |M| = |U| = |V|);
    while U has a unvisited free u vertex and augmenting path not found;
        Call find_augmenting_path subroutine on u (mark u as visited);
    if augmenting path P found;
        augmentation M by P as described above (increasing size of M by 1);
    else;
        Call update_labels subroutine;
Subroutine: find_augmenting_path;
Input: Free Vertex u ∈ U;
Initialize queue Q by inserting u;
while Q is not empty;
    Extract candidate x from Q;
    for each neighbour v ∈ V of x;
        if reduced cost $c^r$(x, v) using Eq. (1) is zero;
            if v is a free vertex (i.e., not covered by M);
                Return path from u to v as augmenting path;
            Else;
                Add each neighbour u ∈ U of v where (u, v) ∈ M to Q;
Subroutine: update_labels;
Input: S = all vertices in U and N(S) visited in V by find_augmenting_path;

-continued

Set $\Delta$ = minimum $c^r$ (u, v) by Eq. (1) where u ∈ S and v ∉ N(S);
for each u ∈ S;
    Increase $l_u$ by $\Delta$;
for each v ∈ N(S);
    Decrease $l_v$ by $\Delta$.

In an embodiment, the step of "Compute Edge Costs c(u, v)∀u∈U and v∈V (in a m×m matrix)" may be responsible for edge cost computation time shown in FIG. 3. In an embodiment, this step may be modified to significantly reduce the overall computational cost of the algorithm. In an embodiment, by modifying this step and not computing all edge costs, the overall computational costs and computational time may be reduced.

Figure 5:
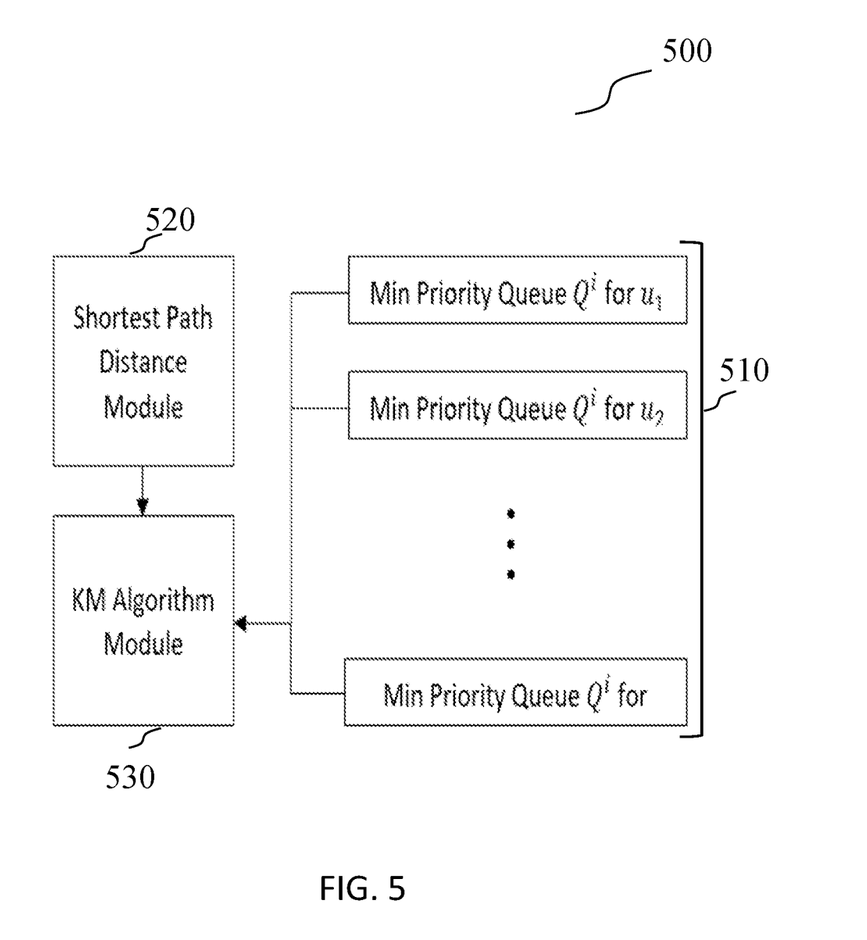
FIG. 5 shows a schematic diagram of an exemplary system according to various embodiments.

FIG. 5 shows a schematic diagram of an exemplary system according to various embodiments.

In an embodiment, a priority queue, for example, a lazy minimum priority queue, may be used to determine when it is necessary to compute cost c(u, v) during the algorithm process.

In an embodiment, given a bipartite matching query for bipartite sets U and V, priority queue $Q^u$ for vertex u∈U populated with vertices from V may be created. In an embodiment, the key for each vertex v∈V key may be a lower-bound cost $c^{lb}(u, v)$. In an embodiment, the priority queue $Q^u$ may be populated in a lazy manner. In an embodiment, the priority queue does not need to include all vertices in V. In an embodiment, the priority queue may include enough vertices such that the following property holds true:

Property 1. Let MinKey($Q^u$) be the minimum key in the priority queue $Q^u$. For any vertex v∈V not yet extracted from the queue, $Q^u$ will satisfy the following property: c(u, v)≥MinKey($Q^u$).

In other words, according to Property 1, the queue $Q^u$ may define a lower-bound cost for all remaining edges from vertex u.

In an embodiment, a minimum priority queue may be created for each unmatched first object of the first set of first objects. The minimum priority queue for each unmatched first object of the first set of first objects may include unmatched second objects of the second set of second objects.

In an embodiment, a first set of edge data may be determined. In an embodiment, lower-bound reduced costs for matching each unmatched first object with the unmatched second objects may be less than or equal to zero.

In an embodiment, the technique disclosed herein may be agnostic to the implementation of the priority queue and type of cost c(u, v), and can be applied to any problem setting.

In the system 500 of the example of FIG. 5, the implementation may involve costs based on shortest paths on graphs, where significant benefits may be gained. This is because computation of shortest paths in road network graphs may be a highly computationally intensive task.

In the example of FIG. 5, the priority queues 510 for each vertex u∈U may be exposed to the algorithm module 530. A module 520 to compute the true cost c(u, v) (e.g., when deemed necessary) for example, using a fast shortest path distance technique such as Contraction Hierarchies may also be sent to the algorithm module 530.

In an embodiment, the system 100 or the system 500 may propose two refinement rules, which may designate when an exact cost c(u, v) must be computed. In an embodiment, refinement may involve extracting the element v in a priority queue $Q^u$ with minimum key, and/or computing its cost c(u, v), and/or updating MinKey($Q^u$). In an embodiment, we may define a lower-bound reduced cost based on all vertices from V remaining in a priority queue $Q^u$ based on Eq. (1) as follows: $LB^r(u,v)=MinKey(Q^u)-l_u-l_v$ (Equation 5).

In an embodiment, during the BFS expansion in the augmenting path search, the algorithm may expand all "tight" edges, i.e., those with reduced cost zero. In an embodiment, for correctness of this expansion, the following refinement rules for invariants continue to hold may be as follow:

Rule 1. If the lower-bound reduced cost for an edge $LB^r(u, v)$ is less than or equal to zero, the priority queue may be refined until it is not. In other words, extract elements from until $Q^u$ and compute their edge cost until MinKey $(Q^u)-l_u-l_v>0$, or v is extracted from the $Q^u$ and cost c(u, v) is computed.

In an embodiment, Rule 1 utilizes the fact that the BFS is concerned with edges that are tight (i.e., with reduced cost zero). So, if the lower-bound reduced edge cost is greater than zero for all remaining edges, then the remaining edges may be ignored during the BFS as the remaining edges cannot currently be tight. Thus, the BFS may occur in an identical manner without the need to compute exact costs for all edges.

In an embodiment, the second refinement rule may be used during computation of Δ by Eq. (4). Let $\alpha: =\{max(l_v): v \notin N(S)\}$, i.e., the maximum label value for vertices not in set N(S). In an embodiment, an iterative algorithm may be used to refine and update Δ until its final value is attained. In an embodiment, a lower-bound $\Delta_{LB}(u)$ using the minimum priority queue $Q^u$ and the value of α may be as follows: $\Delta_{LB}(U)=MinKey(Q^u)-l_u-\alpha$ (Equation 6). In an embodiment, the second refinement rule may be as follows:

Rule 2. The refinement rule algorithm may begin by initializing $\Delta_{cand}$ as the minimum reduced cost $c^r(u, v)$ amongst u∈S and v∉N(S) for which c(u, v) has been already calculated. In an embodiment, $\Delta_{cand}$ may be the candidate value of Δ that may be iteratively update until it is correct. In an embodiment, given $Q^u$ where u ∈ S, a lower-bound $\Delta^{LB}$ may be computed using Eq. (6). In an embodiment, while $\Delta^{LB}<-\Delta^{cand}$, $Q^u$ may be refined. In an embodiment, during refinement, a vertex v∉N(S) is extracted from $Q^u$, $\Delta_{cand}$ may be updated if $c^r(u, v)<\Delta_{cand}$. In an embodiment, once $Q^u$ is sufficiently refined (i.e., $\Delta_{LB}\geq\Delta_{cand}$), $\Delta_{cand}=\Delta$.

In an embodiment, equation (6) and Rule 2 may ensure that no other possible Δ may be lower than the one computed by the refinement algorithm. In an embodiment, similar to Rule 1, this may be done in a greedy heuristic way, such that only refine edges (and thus compute exact costs) when it is necessary while still producing the same result as the original KM algorithm.

In an embodiment, using the priority queue and low bound cost described above, a modified version of the Kuhn-Munkres algorithm that may avoid computing the entire matrix of edge costs may be obtained.

In an embodiment, the pseudocode for the modified Kuhn-Munkres Algorithm may be as follows:

```
Input: Bipartite Sets U and V with size |U| = |V| = m;
Initialize matching M = Φ;
Initialize labels l_u = l_v = 0 ;
Component 1: Initialize Lazy MPQ Q^u for each u ∈ U;
    while M is not a perfect matching (i.e., |M| = |U| = |V|);
        while U has a unvisited free u vertex and augmenting path not found;
            Call find_augmenting_path subroutine on u (mark u as visited);
```

-continued

```
            if augmenting path P found;
                augmentation M by P as described above (increasing size of M by 1);
            else;
                Call update_labels subroutine.
```

In an embodiment, for Component 1 in bold above, a priority queue may be generated to decide when to compute edge cost c(u, v), as opposed to computing all edge costs initially in the original KM algorithm.

In an embodiment, the pseudocode for subroutine: find_augmenting_path may be as follows:

```
Input: Free Vertex u ∈ U;
Initialize queue Q by inserting u;
while Q is not empty;
    Extract candidate x from Q;
    for each neighbour v ∈ V of x ;
        Component 2: if c(u, v) is not yet computed and LB^r
        (u, v) by Eq. (5) is
zero;
        while LB^r (u, v) by Eq. (5) is
        zero and c(u, v) not is not yet computed;
            Call refine_queue on Lazy MPQ Q^u;
        if c(u, v) is computed and reduced cost c^r (x, v) using Eq. (1) is zero;
            if v is a free vertex (i..e., not covered by M);
                Return path from u to v as augmenting path;
            else;
                Add each neighbour u ∈ U of v where (u, v) ∈ M to Q.
```

In an embodiment, for Component 2 in bold above, the addition of this component to the algorithm may ensure that the algorithm complies with Rule 1 in that c(u, v) is only compute when it is necessary. With this component, only the true edge costs for edges that are traversed by the BFS are needed.

In an embodiment, the pseudocode for subroutine: update_labels may be as follows:

```
Input: S = all vertices in U and N(S) visited in
V by find_augmenting_path;
Component 3:
Set Δ =minimum c^r (u, v) for u ∈
S and v ∉ N(S) where c(u, v) has been computed;
for each u ∈ S;
    while Δ_{LB}(u) < Δ_{cand} where Δ_{LB}(u) is computed by Eq. (6);
        Call refine_queue on Lazy MPQ Q^u;
        Let e ∈ V be element refined by refine_queue
        (i.e., computed c(u, e));
        if e ∉ N(S) and c^r (u, e) < Δ_{cand};
            Set Δ_{cand} = c^r (u, e) as we
            have found a better value;
for each u ∈ U;
    Increase l_u by Δ;
for each v ∈ v;
    Decrease l_v by Δ.
```

In an embodiment, for Component 3 in bold above, Rule 2 may be incorporated into the algorithm to so that cost c(u, v) may be only computed when it is necessary. Component 3 allows computation of costs c(u, v) if the priority queue still includes an element that can be used to compute the true value of d. This may reduce computation costs and time.

In an embodiment, the pseudocode for subroutine: refine queue may be as follows: Component 4:

```
Subroutine: refine_queue;
Input: Lazy MPQ Q for some vertex u ∈ U;
Extract minimum element e ∈ V from Q;
Compute edge cost c(u, e) and update matrix;
Lazily populate Q such that Property 1 is still true;
```

In an embodiment, Component 4 in bold above may be a new subroutine that may be associated with the priority queue for the algorithm to comply with Property 1 and may be used to compute edge costs correctly (i.e., without missing any necessary results).

In an embodiment, the technique disclosed herein may be used in one of: allocating passengers to drivers in ride-hailing services, packet switching in communication networks, transportation problem, e.g., assigning warehouses to factories, facility allocation problems, e.g., parking spots to drivers and/or scheduling problems, e.g., matching jobs to workers.

In an embodiment, the embodiments disclosed herein may be software solutions which may be implemented on any suitable hardware system that may execute algorithms (i.e., software codes).

In an embodiment, the improvements such as lower computational cost and/or faster computational time achieved by the embodiments disclosed herein may be consistent across different hardware systems.

In an embodiment, the embodiments disclosed herein may increase the query throughput of a given hardware system implementing bipartite matching. This can be considered as a measure of the maximum throughput on a given hardware system.

Table 1 shows maximum m per window sizes for various techniques.

TABLE 1

| | Maximum m per Window Size | | |
|---|---|---|---|
| Techniques | W = 15 s | W = 30 s | W = 60 s |
| Original KM + Dijkstra | m = 575 | m = 1050 | m = 1675 |
| Original KM + CH | m = 575 | m = 800 | m = 1150 |
| Original KM + G-tree | m = 900 | m = 1200 | m = 1650 |
| Disclosed techniques + Dijkstra | m = 1400 | m = 1750 | m = 2275 |
| Disclosed techniques + G-tree | m = 1425 | m = 1775 | m = 2250 |

In an embodiment, in Table 1, time window W may be the maximum time allowable for bipartite matching. In an embodiment, m may be the maximum size of the matching that may be supported by each technique such that bipartite matching may be completed within the time window W. In the example of Table 1, experiments were conducted for the Singapore road network using simulated bipartite matching sets on the same hardware system. As shown, the techniques disclosed herein resulted in significantly higher throughput with the same hardware system.

While the present disclosure has been particularly shown and described with reference to specific aspects, it should be understood by those skilled in the art that various changes in form and detail may be made therein without departing from the scope of the present disclosure as defined by the appended claims. The scope of the present disclosure is thus indicated by the appended claims and all changes which come within the meaning and range of equivalency of the claims are therefore intended to be embraced.

What is claimed is:

1. A system for bipartite matching in a transportation problem, the system comprising:
one or more processors; and
a memory having instructions stored therein, the instructions, when executed by the one or more processors, causing the one or more processors to:
receive a first set of transportation consumers and a second set of transportation suppliers, the first set of transportation consumers including a plurality of transportation consumer data objects, each transportation consumer data objects received from a passenger device and including information identifying a passenger and a passenger location, the second set of transportation suppliers including a plurality of transportation supplier data objects, each transportation supplier data object received from a driver device and including information identifying a driver and a driver location;
iteratively process the first set to:
identify an unmatched transportation consumer data object;
create a minimum priority queue for the unmatched transportation consumer data object, wherein the minimum priority queue for the unmatched transportation consumer data object comprises unmatched transportation supplier data objects of the second set;
determine a first set of edge data in which lower-bound reduced costs for matching the unmatched transportation consumer data object with the unmatched transportation supplier data objects is less than or equal to zero;
determine an exact cost of each edge data in the first set of edge data, the exact cost of each edge data based at least in part on a distance between a passenger location and a driver location;
determine whether an augmenting path exists between the unmatched transportation consumer data object and an unmatched transportation supplier data object of the second set based on the exact cost of each edge data in the first set of edge data;
in the case where an augmenting path exists, convert the unmatched transportation consumer data object and the unmatched transportation supplier data object to a matched transportation consumer data object and a matched transportation supplier data object and transmit a notification informing the passenger device and the driver device of the match;
in the case where an augmenting path does not exist, automatically determine a lower-bound of a minimum reduced cost of the first set of edge data by initializing a candidate value as the minimum reduced cost based on the previously determined lowest exact cost, the minimum reduced cost being a minimum of the reduced costs;
updating the minimum priority queue with the determined lower-bound of the minimum reduced cost and repeating the processing to determine whether an augmenting path exists until an augmenting path is found; and
repeating the iterative processing of the set until all transportation consumers have been matched.

2. The system of claim 1, wherein the memory further comprises instructions to cause the one or more processors to match each unmatched transportation consumer data object of the first set with an unmatched transportation supplier data object of the second set using a Breadth-first search (BFS) algorithm.

3. The system of claim 1, wherein the memory further comprises instructions to cause the one or more processors to give a first label to the first set of transportation consumer data objects and a second label to the second set of transportation supplier data objects, and wherein the exact cost of each edge data is based on the lower-bound reduced costs, the first label and the second label.

4. The system of claim 3, wherein the memory further comprises instructions to cause the one or more processors to update the first label to obtain an updated first label and configured to update the second label to obtain an updated second label based on the minimum reduced cost.

5. The system of claim 4, wherein the memory further comprises instructions to cause the one or more processors to obtain the updated first label by addition of the first label with the minimum reduced cost and configured to obtain the updated second label by subtraction of the second label with the minimum reduced cost.

6. The system of claim 4, wherein the memory further comprises instructions to cause the one or more processors to determine if there are any unmatched transportation consumer data objects, and configured to determine a second exact cost of each edge data based on the lower-bound reduced costs, the updated first label and the updated second label and configured to match the unmatched transportation consumer data objects based on the second exact cost.

7. The system of claim 1, wherein the memory further comprises instructions to cause the one or more processors to update the minimum priority queue for each unmatched transportation consumer data objects of the first set after the exact cost of each edge data in the first set of edge data is determined by arranging the minimum priority queue according to an ascending order of the exact cost of each edge data.

8. The system of claim 1, wherein the memory further comprises instructions to cause the one or more processors to update the minimum priority queue for each unmatched transportation consumer data object of the first set after the exact cost of each edge data in the first set of edge data is determined by removing unmatched transportation supplier data objects which have the lower-bound reduced costs for matching each unmatched transportation consumer data object of more than zero.

9. The system of claim 1, wherein the first set of transportation consumer data objects comprises a set of passengers and the second set of transportation supplier data objects comprises a set of drivers, and wherein the exact cost of each edge data in the first set of edge data is a distance between each passenger in the set of passengers and each driver in the set of drivers.

10. The system of claim 1, wherein the memory further comprises instructions to cause the one or more processors to populate the minimum priority queue in a lazy manner.

11. A method for bipartite matching comprising:
using one or more processors to:
receive a first set of transportation consumers and a second set of transportation suppliers, the first set of transportation consumers including a plurality of transportation consumer data objects, each transportation consumer data objects received from a passenger device and including information identifying a passenger and a passenger location, the second set of transportation suppliers including a plurality of transportation supplier data objects, each transportation supplier data object received from a driver device and including information identifying a driver and a driver location;
iteratively process the first set to:
identify an unmatched transportation consumer data object;
create a minimum priority queue for the unmatched transportation consumer data object of the first set, wherein the minimum priority queue for the unmatched transportation consumer data object comprises unmatched transportation supplier data objects of the second set;
determine a first set of edge data in which lower-bound reduced costs for matching the unmatched transportation consumer data object with the unmatched transportation supplier data objects is less than or equal to zero;
determine an exact cost of each edge data in the first set of edge data, the exact cost of each edge data based at least in part on a distance between a passenger location and a driver location; and
determine whether an augmenting path exists between the unmatched transportation consumer data object and an unmatched transportation supplier data object of the second set based on the exact cost of each edge data in the first set of edge data;
in the case where an augmenting path exists, convert the unmatched transportation consumer data object and the unmatched transportation supplier data object to a matched transportation consumer data object and a matched transportation supplier data object and transmit a notification informing the passenger device and the driver device of the match;
in the case where an augmenting path does not exist, automatically determine a lower-bound of a minimum reduced cost of the first set of edge data by initializing a candidate value as the minimum reduced cost based on the previously determined lowest exact cost, the minimum reduced cost being a minimum of the reduced costs;
updating the minimum priority queue with the determined lower-bound of the minimum reduced cost and repeating the processing to determine whether an augmenting path exists until an augmenting path is found; and
repeating the iterative processing of the set until all transportation consumers have been matched.

12. The method of claim 11, further comprising using the one or more processors to:
match each unmatched transportation consumer data object of the first set with an unmatched transportation supplier data object of the second set using a Breadth-first search (BFS) algorithm.

13. The method of claim 11, further comprising using the one or more processors to:
give a first label to the first set of transportation consumer data objects and a second label to the second set of transportation supplier data objects, wherein the exact cost of each edge data is based on the lower-bound reduced costs, the first label and the second label.

14. The method of claim 13, further comprising using the one or more processors to:
update the first label to obtain an updated first label and configured to update the second label to obtain an updated second label based on the minimum reduced cost.

15. The method of claim 14, further comprising using the one or more processors to:
obtain the updated first label by addition of the first label with the minimum reduced cost; and
obtain the updated second label by subtraction of the second label with the minimum reduced cost.

16. The method of claim 14, further comprising using the one or more processors to:
determine if there are any unmatched transportation consumer data objects;
determine a second exact cost of each edge data based on the lower-bound reduced costs, the updated first label and the updated second label; and
match the unmatched transportation consumer data objects based on the second exact cost.

17. The method of claim 11, further comprising using the one or more processors to:
update the minimum priority queue for each unmatched transportation consumer data object of the first set after the exact cost of each edge data in the first set of edge data is determined by arranging the minimum priority queue according to an ascending order of the exact cost of each edge data.

18. The method of claim 11, further comprising using the one or more processors to:
update the minimum priority queue for each unmatched transportation consumer data object of the first set after the exact cost of each edge data in the first set of edge data is determined by removing unmatched transportation supplier data objects which have the lower-bound reduced costs for matching each unmatched transportation consumer data object of more than zero.

19. The method of claim 11, wherein the first set of objects comprises a set of passengers and the second set of objects comprises a set of drivers, and wherein the exact cost of each edge data in the first set of edge data is a distance between each passenger in the set of passengers and each driver in the set of drivers.

20. A non-transitory computer-readable medium comprising instructions which, when the instructions are executed by a computer, cause the computer to carry out a method for bipartite matching, the method comprising:
using one or more processors to:
receive a first set of transportation consumers and a second set of transportation suppliers, the first set of transportation consumers including a plurality of transportation consumer data objects, each transportation consumer data objects received from a passenger device and including information identifying a passenger and a passenger location, the second set of transportation suppliers including a plurality of transportation supplier data objects, each transportation supplier data object received from a driver device and including information identifying a driver and a driver location;
iteratively process the first set to:
identify an unmatched transportation consumer data object;
create a minimum priority queue for the unmatched transportation consumer data object, wherein the minimum priority queue for the unmatched transportation consumer data object comprises unmatched transportation supplier data objects of the second set;
determine a first set of edge data in which lower-bound reduced costs for matching the unmatched transportation consumer data object with the unmatched transportation supplier data objects is less than or equal to zero;
determine an exact cost of each edge data in the first set of edge data, the exact cost of each edge data based at least in part on a distance between a passenger location and a driver location; and
determine whether an augmenting path exists between the unmatched transportation consumer data object and an unmatched transportation supplier data object of the second set based on the exact cost of each edge data in the first set of edge data;
in the case where an augmenting path exists, convert the unmatched transportation consumer data object and the unmatched transportation supplier data object to a matched transportation consumer data object and a matched transportation supplier data object and transmit a notification informing the passenger device and the driver device of the match;
in the case where an augmenting path does not exist, automatically determine a lower-bound of a minimum reduced cost of the first set of edge data by initializing a candidate value as the minimum reduced cost based on the previously determined lowest exact cost, the minimum reduced cost being a minimum of the reduced costs;
updating the minimum priority queue with the determined lower-bound of the minimum reduced cost and repeating the processing to determine whether an augmenting path exists until an augmenting path is found; and
repeating the iterative processing of the set until all transportation consumers have been matched.

* * * * *